US010488828B2

(12) United States Patent
Abdelkhalik et al.

(10) Patent No.: US 10,488,828 B2
(45) Date of Patent: Nov. 26, 2019

(54) MULTI-RESONANT FEEDBACK CONTROL OF MULTIPLE DEGREE-OF-FREEDOM WAVE ENERGY CONVERTERS

(71) Applicants: National Technology & Engineering Solutions of Sandia, LLC, Albuquerque, NM (US); Ossama Abdelkhalik, Houghton, MI (US); Shangyan Zou, Houghton, MI (US); Rush D. Robinett, III, Tijeras, NM (US); Umesh Korde, Hancock, MI (US)

(72) Inventors: Ossama Abdelkhalik, Houghton, MI (US); Shangyan Zou, Houghton, MI (US); Rush D. Robinett, III, Tijeras, NM (US); David G. Wilson, Tijeras, NM (US); Giorgio Bacelli, Albuquerque, NM (US); Ryan Geoffrey Coe, Albuquerque, NM (US); Umesh Korde, Hancock, MI (US)

(73) Assignees: National Technology & Engineering Solutions of Sandia, LLC, Albuquerque, NM (US); Michigan Technological University, Houghton, MI (US); South Dakota Board of Regents, Pierre, SD (US)

( * ) Notice: Subject to any disclaimer, the term of this patent is extended or adjusted under 35 U.S.C. 154(b) by 116 days.

(21) Appl. No.: 15/830,770

(22) Filed: Dec. 4, 2017

(65) Prior Publication Data

US 2018/0164755 A1    Jun. 14, 2018

Related U.S. Application Data

(60) Provisional application No. 62/432,409, filed on Dec. 9, 2016.

(51) Int. Cl.
*G05B 11/38* (2006.01)
*F03B 13/22* (2006.01)
(Continued)

(52) U.S. Cl.
CPC ............. *G05B 11/38* (2013.01); *F03B 13/22* (2013.01); *F03B 15/00* (2013.01); *G06F 17/142* (2013.01);
(Continued)

(58) Field of Classification Search
CPC .......... G05B 11/38; F03B 13/16; F03B 13/22; F03B 15/00; G06F 17/142
(Continued)

(56) References Cited

U.S. PATENT DOCUMENTS 9,140,231 B1 * 9/2015 Wilson .................... F03B 15/00
2014/0159822 A1 * 6/2014 Spahlinger ............... H03L 7/00
331/35

OTHER PUBLICATIONS

Abdelkhalik, O. et al., "On the control design of wave energy converters with wave prediction", J. Ocean Eng. Mar. Energy 2(4) (2016), pp. 473-483.
(Continued)

*Primary Examiner* — Mohammad Ali
*Assistant Examiner* — Joshua T Sanders
(74) *Attorney, Agent, or Firm* — Kevin W. Bieg

(57) ABSTRACT

Multi-resonant control of a 3 degree-of-freedom (heave-pitch-surge) wave energy converter enables energy capture that can be in the order of three times the energy capture of a heave-only wave energy converter. The invention uses a time domain feedback control strategy that is optimal based on the criteria of complex conjugate control. The multi-resonant control can also be used to shift the harvested energy from one of the coupled modes to another, enabling the elimination of one of the actuators otherwise required in
(Continued)

a 3 degree-of-freedom wave energy converter. This feedback control strategy does not require wave prediction; it only requires the measurement of the buoy position and velocity.

4 Claims, 14 Drawing Sheets

(51) Int. Cl.
    *F03B 15/00*    (2006.01)
    *G06F 17/14*    (2006.01)

(52) U.S. Cl.
    CPC ..... *F05B 2240/93* (2013.01); *F05B 2250/231* (2013.01); *F05B 2250/241* (2013.01); *F05B 2270/20* (2013.01)

(58) Field of Classification Search
    USPC .......................................................... 700/275
    See application file for complete search history.

(56) References Cited

OTHER PUBLICATIONS

Fusco, F. and J. V. Ringwood, "A Simple and Effective Real-Time Controller for Wave Energy Converters", IEEE Trans. Sustain. Energy 4 (1) (2013), pp. 21-30.

Fusco, F. and Ringwood, J., "Hierarchical Robust Control of Oscillating Wave Energy Converters With Uncertain Dynamics", IEEE Trans. Sustain. Energy 5(3) (2014), pp. 958-966.

Hals, J. et al., "Constrained Optimal Control of a Heaving Buoy Wave-Energy Converter", J. Offshore Mech. Arctic Eng. 133(1) (2011), pp. 011401-1-011401-15.

Hals, J. et al., "A Comparison of Selected Strategies for Adaptive Control of Wave Energy Converters", J. Offshore Mech. Arctic Eng. 133(3), 031101 (2011), pp. 031101-1-031101-12.

Li, G. et al., "Wave energy converter control by wave prediction and dynamic programming", Renew. Energy 48 (2012), pp. 392-403.

Nielson, S. R. et al., "Optimal control of nonlinear wave energy point converters", Ocean Eng. 72 (2013), pp. 176-187.

Ringwood, J. et al., "Energy-Maximizing Control of Wave-Energy Converters", IEEE Control Syst. Mag. 34(5) (2014), pp. 30-55.

Scruggs, J. et al., "Optimal causal control of a wave energy converter in a random sea", Appl. Ocean Res. 42 (2013), pp. 1-15.

Yavuz, H., "On Control of a Pitching and Surging Wave Energy Converter", Int. J. Green Energy 8(5) (2011), pp. 555-584.

* cited by examiner

MULTI-RESONANT FEEDBACK CONTROL OF MULTIPLE DEGREE-OF-FREEDOM WAVE ENERGY CONVERTERS

CROSS-REFERENCE TO RELATED APPLICATION

This application claims the benefit of U.S. Provisional Application No. 62/432,409, filed Dec. 9, 2016, which is incorporated herein by reference. This application is related to U.S. application Ser. No. 15/830,752, titled "Multi-resonant feedback control of a single degree-of-freedom wave energy converter," filed of even date with this application, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to wave energy conversion and, in particular, to multi-resonant feedback control of multiple degree-of-freedom wave energy converters.

BACKGROUND OF THE INVENTION

Renewable energy continues to receive interest because of the growing energy needs and the limitations associated with classical energy sources in terms of environmental effects and the available reserves. Wave energy is a renewable source that has great potential yet to be utilized. One of the main reasons that wave energy is not yet in a fully commercial state is the lack of economic design of a Wave Energy Converter (WEC). Most of the existing studies in wave energy focus on single Degree-Of-Freedom (DOF) WECs. See U. A. Korde, "On control approaches for efficient primary energy conversion in irregular waves," *OCEANS '98 Conference Proceedings*, vol. 3, September 1998, pp. 1427-1431 vol. 3; U. A. Korde et al., "Time domain control of a single mode wave energy device," *Proceedings of the Eleventh International Offshore and Polar Engineering Conference*, Stavanger, Norway, 2001, pp. 555-560; F. Fusco and J. Ringwood, *IEEE Trans. Sustain. Energy* 5(3), 958 (2014); and J. Ringwood et al., *IEEE Control Syst. Mag.* 34(5), 30 (2014); and J. Scruggs et al., *Appl. Ocean Res.* 42, 1 (2013). There are a variety of methods for single DOF heave control that range from controls that do not need reactive power, such as the resistive control and latching, to more complex methods that require an actuator with the capability to provide reactive power. See D. G. Wilson et al., "A comparison of wec control strategies," Sandia National Laboratories, Albuquerque, N. Mex., Tech. Rep. SAND2016-4293, May 2016; A. Babarit et al., *Appl. Ocean Res.* 26, 227 (2004); and J. Henriques et al., *Renew. Energy* 45, 31 (2012). Of particular importance among the different control strategies is the well-known complex conjugate control (C3). The C3 criteria are two-fold. First, it resonates the system natural frequencies with the frequencies of the wave excitation force. Second, it adds damping that is equal in magnitude to the system's damping at each frequency. These C3 criteria are shown to guarantee optimal energy harvesting in heave motion. See J. Falnes, *Ocean Waves and Oscillating Systems—Linear Interactions Including Wave-Energy Extraction*, Cambridge University Press, 2002, ch. 4. The implementation of the C3 criteria, however, has its own challenges; of them is the need to know the frequencies of the wave excitation force. This motivates the wave-by-wave control approach, in which the up-wave elevation measurements are needed. See U. Korde et al., "Approaching maximum power conversion with exergy-based adaptive wave-by-wave control of a wave energy converter," *Proceedings of MTS/IEEE OCEANS*, Genova, Italy, May 18-21 2015; and U. A. Korde, "Up-wave surface elevation for smooth hydrodynamic control of wave energy conversion in irregular waves," *Oceans—San Diego*, 2013, September 2013, pp. 1-10. Other studies have investigated the use of relative motion of multiple bodies in a heave mode. See J. Ringwood et al., *IEEE Control Syst. Mag.* 34(5), 30 (2014); and J. Falnes, *J. Offshore Mech. Arct. Eng.* 121(1), 32 (1999). Davis et al., for instance, presented a sensitivity analysis for a three-body heave WEC to examine how the characteristics of the heave plate and the component masses affect the performance of the system, and concluded that the system is dominated by inertia more than drag. See A. F. Davis et al., "Modeling and analysis of a multi degree of freedom point absorber wave energy converter," *Proceedings of the ASME* 2014 *33rd International Conference on Ocean, Offshore and Arctic Engineering*, OMAE2014, no. OMAE2014-23475. San Francisco, Calif., USA: ASME, Jun. 8-13 2014.

The main reason for the focus on single DOF WECs is the complexity of designing multiple DOF actuators in addition to the complexity of the control logic itself. On the other hand, other references motivate the use of a multiple-DOF WEC as opposed to a single-mode WEC. See D. V. Evans, *J. Fluid Mech.* 77, 1 (1976). Evans extended the results of two-dimensional WECs to bodies in channels that accounts for the effect of body orientation on the energy harvesting. See D. Evans, "Some theoretical aspects of three-dimensional wave-energy absorbers," *Proceedings of the first symposium on wave energy utilization*, Chalmers University of Technology, Gothenburg, Sweden, 1979, pp. 77-106. French and Bracewell point out that the power that can be extracted from a mode that is antisymmetric to the wave (such as pitch and surge) is twice as much as can be extracted from a mode that is symmetric (such as heave). See M. J. French and R. H. Bracewell, "P.s. frog a point-absorber wave energy converter working in a pitch/surge mode," *Proceedings of The Fifth International Conference on Energy Options: the role of alternatives in the world energy scene*, University of Reading, Reading, Berkshire, UK, IEE, 1987. French and Bracewell also point out that roll, yaw, and sway modes are not coupled to the wave and hence conclude that the pitch and surge motions are the most attractive power conversion modes. Moreover, the reactive power in the pitch and surge modes is less than that in the heave mode for the frog system proposed by French and Bracewell. Yavuz recently studied the pitch-surge power conversion. See H. Yavuz, *Int. J. Green Energy* 8(5), 555 (2011). Yavuz models the pitch-surge motions assuming no heave motion; hence there is no effect from the heave motion on the pitch-surge power conversion. The mathematical model used in Yavuz for the motions in these two DOFs is coupled through mass and damping only; there is no coupling in the stiffness. A Proportional-Derivative (PD) control is used in Yavuz; the controller gains are tuned based on a fourth order polynomial in frequency.

However, a need remains for a WEC that can efficiently extract wave energy over a full range of wave frequencies in the heave, pitch, and surge modes and that does not require prediction of the wave excitation force.

SUMMARY OF THE INVENTION

The present invention is directed to multi-resonant feedback control of three-degree-of-freedom (heave, pitch, and surge) wave energy converters. The invention uses multi-resonant feedback control, in a general framework, for three-dimensional wave energy converters that are modeled by linear time invariant dynamic systems. The multi-resonant control strategy finds the optimal control in the sense that it computes the control based on the complex conjugate criteria. This control strategy is relatively easy to implement since it uses feedback control in the time domain that requires only measurements of the buoy motion. As examples of the invention, numerical tests are described for two different buoy shapes: a sphere and a cylinder. Regular, Bretschnieder, and Ochi-Hubble waves were tested. Simulation results show that the controller can be easily implemented to harvest energy in the pitch-surge-heave modes that is about three times the energy that can be harvested using a heave-only device.

Harvesting energy in 3-DOF poses the challenge of developing 3-DOF actuators, which can have a significant impact on the complexity and cost of the WEC system. Depending on the buoy shape, some of these modes can be coupled in a dynamic model. The pitch and surge motions are usually coupled. This coupling motivates the shifting of the harvested energy between these two coupled modes, aiming at eliminating one actuator of one mode. In other words, due to the coupling, a controller can be designed that allows high energy harvesting in one mode while the energy harvesting from the other coupled mode vanishes. Therefore, multi-resonant control can also be used to shift the energy harvesting between the coupled modes which can be exploited to eliminate one of the actuators while maintaining about the same level of energy harvesting.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to multi-resonant control of a 3-DOF heave-pitch-surge WEC. The multi-resonant feedback control strategy is an extension of the multi-resonant control developed for the single DOF heave linear motion WEC described in the related U.S. application Ser. No, 15/830,752. The invention can be used with a variety of WECs and controllers thereof. For example, various technologies pertaining to designing and implementing a controller, wherein the controller is configured to improve efficiency of the WEC by expanding a wave frequency spectrum over which the WEC can efficiently absorb wave energy are described in related U.S. Pat. No. 9,140,231, which is incorporated herein by reference.

Figure 1:
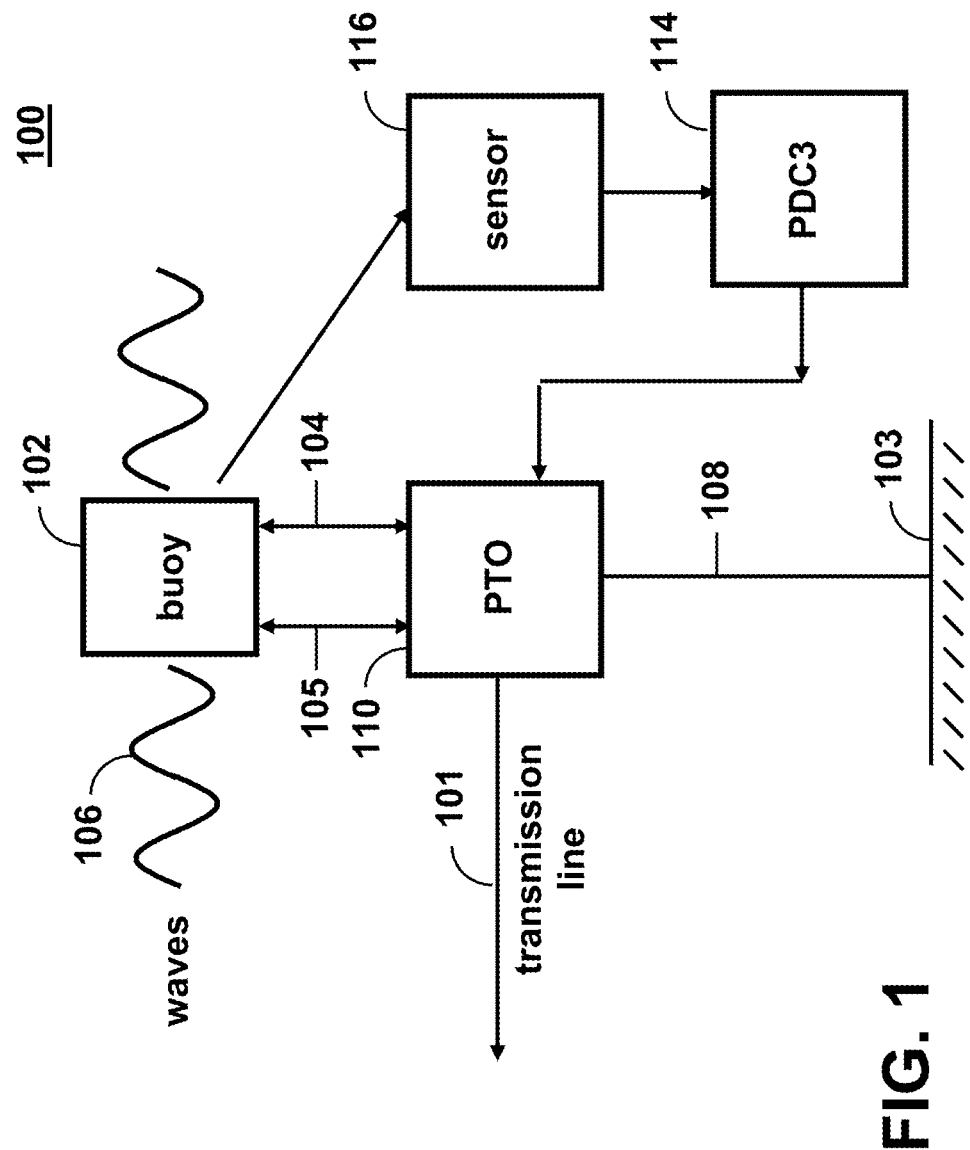
FIG. 1 is a schematic illustration of a wave energy converter (WEC).

An exemplary WEC 100 is illustrated in FIG. 1. The WEC 100 is intended to be placed in a body of water (e.g., the ocean) and subjected to wave motion of varying amplitude and frequency. The WEC 100 can be classified as a resonant responder, as its structural design can have a resonance frequency that is within a predominant wave frequency spectrum of the body of water in which the WEC 100 is deployed. When a series of waves 106 of the resonance frequency impact the WEC 100, the WEC 100 will resonantly respond, thus absorbing a relatively large amount of energy of the waves 106 that are impacting the WEC. Thus, the WEC 100 can be configured to convert incident energy existent in waves 106 into mechanical energy. The mechanical energy harvested from the waves is than transformed into electrical energy, and can be transmitted from a power take-off (PTO) 110 by way of a transmission line 101 to a substation or other suitable energy or transmission system. Additionally, while not shown, the WEC 100 can include local storage, such as a battery, a capacitor bank, or the like, that can at least temporarily retain DC energy in the WEC 100. Further, the WEC 100 can extract such stored energy when needed, wherein extracted energy can be used to control the operation of the WEC 100, to provide power to lights on the WEC, to provide power to sensors on the WEC, to provide power to a processor or circuit that processes sensor data, to provide power to a transceiver that communicates to another system or WEC, etc.

The exemplary WEC 100 is shown includes a buoy 102 that is mechanically coupled to a reference, in this example a stationary reference anchored to an ocean-floor mooring 103. The buoy 102 is designed to generally move with 3 DOFs (up and down along a vertical axis in a heaving motion, in an up/down rotation about a center-of-gravity in a pitching motion, and back-and-forth, side-to-side in a surging motion) in phase with waves 106 in a body of water. Such body of water 106 can be an ocean, a sea, a relatively large lake, etc. As shown, the reference can remain stationary (e.g., anchored to an ocean-floor mooring 103) as the buoy 102 moves. While the exemplary WEC 100 shown is the simple case of a one-body resonant WEC, aspects described herein are not limited to a one-body absorber. Rather, aspects described herein can be utilized in any resonant WEC, including a two-body resonant WEC, wherein the buoy moves relative to a moveable spar, or an n-body resonant WEC.

A mechanical energy conversion chain 108 couples the buoy 102 and the reference 103. The mechanical energy conversion chain 108 includes a PTO 110. The PTO 110 is configured to convert the heave, pitch, and surge motions 105 of the buoy 102 to electrical energy, which can then be output by way of the transmission line 101. For example, the PTO 110 can include mechanical elements that are generally utilized, for example, to translate the motion 105 of the buoy 102 into rotary motion. The PTO 110 can further include a generator that is configured to translate the rotary motion into electrical energy. Exemplary mechanical elements that can be included in the PTO 110 include, but are not limited to, a rack and pinion system, a hydraulic system, a flywheel, or a ball screw. Additional elements that can be included in the PTO 110 include, but are not limited to, a water turbine, an air turbine, a linear generator, etc.

As indicated above, the WEC 100 can be structurally designed to have a resonant frequency within a predominant spectral range of waves 106 in the body of water. Accordingly, when waves 106 corresponding to the resonant frequency of the WEC 100 impact the WEC 100, relatively large amplitude motion is created between the buoy 102 and the reference, wherein such motion is translated by the PTO 110 into electrical energy. Conventional WECs, however, tend to be relatively inefficient when waves 106 in the body of water do not correspond to the resonant frequency of the WEC 100.

To that end, the WEC 100 can include a controller 114 that is configured to control operation of the PTO 110 to cause the PTO 110 to generate larger amounts of electrical energy over time when compared to conventional WECs. According to the present invention, the controller 114 can be a proportional-derivative complex conjugate control (PDC3) controller. The controller 114 outputs control signals that are received by the PTO 110. The PTO 110 can comprise two or more actuators that operate based upon the control signals received from the controller 114. For example, the controller 114 can utilize reactive control techniques, whereby the controller 114 can cause a motor to affect the displacement between the buoy 102 and the reference 103. In general, the controller 114 can control the PTO 110 to cause the WEC 100 to remain on resonance when off-resonance waves impact the buoy 102, and can cause the WEC 100 to relatively quickly return to resonance when waves impacting the buoy 102 cause the WEC 100 to go off resonance. To that end, the controller 114 can cause the PTO 110 to exert forces 104 on the buoy 102, wherein the exerted forces are in the direction of the heave, pitch, and surge forces exerted on the WEC 100 by an impinging wave 106. In another example, the controller 114 can cause the PTO 110 to exert forces 104 on the buoy 102 in an opposite direction of excitation forces exerted on the WEC 100 by an impinging wave 106.

The controller 114 can take into consideration signals from one or more sensors when controlling operation of the PTO 110. For instance, a sensor 116 can output a signal that is indicative of at least one operating parameter of the PTO 110. Such operating parameter may be, for example, an amount of electrical energy being generated by the PTO 110, positions of mechanical elements in the PTO 110, an amount of force being exerted by the actuator(s) on the buoy 102, etc. The sensor 116 can further provide a signal to the controller 114 indicative of a condition of the WEC 100 relative to its environment. For instance, sensors 116 can be configured to output positional information that indicates heave, surge, and pitch positions of the buoy 102 relative to a reference, such as the ocean floor-mooring 103 or a spar. The controller 114 can be configured to control operation of the PTO 110 based at least in part upon a signal output by the sensor(s) 116. Therefore, the controller 114 can receive signals from the sensors 116 and control operation of the PTO 110 and, therefore, the control forces 104 applied to the buoy 102 based upon the signal. Accordingly, the controller 114 can be implemented as a feedback controller. Design of the controller 114 is now described.

Mathematical Model

Figure 2:
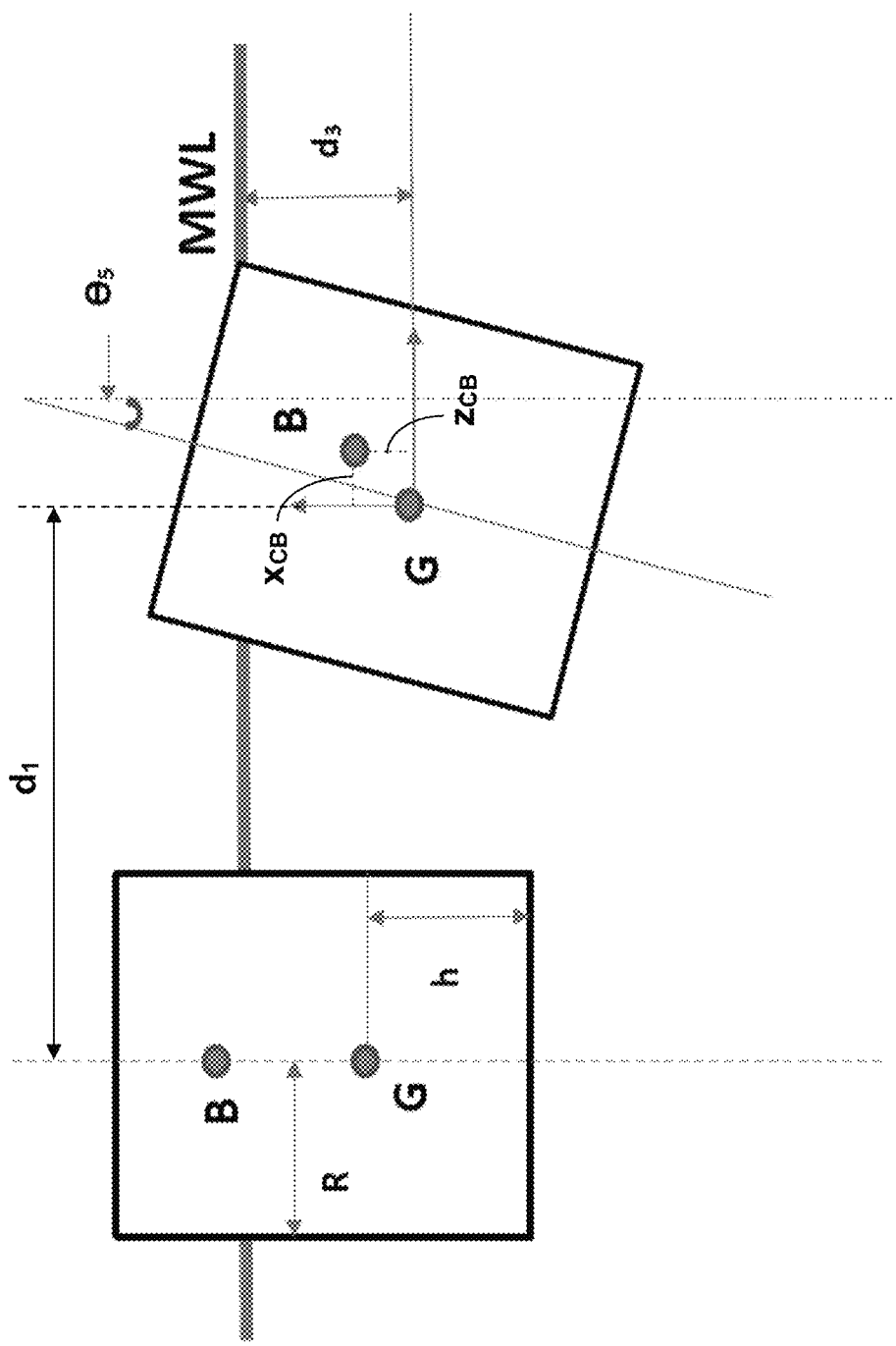
FIG. 2 is a schematic illustration of the geometry of a 3-DOF cylindrical buoy.

Consider the heave, pitch, and surge degrees-of-freedom of a cylindrical buoy with base radius R, and a mass m, as shown in FIG. 2. Assuming a body fixed coordinate system located at the buoy's center-of-gravity (CoG). MWL is the mean water level. The pitch restoring moment is:

$$T_y = -\rho g V x_{CB} \qquad (1)$$

where $x_{CB}$ is the x-coordinate of the center-of-buoyancy (CoB), $\rho$ is the water density, g is the gravitational acceleration, and V is the submerged volume. Let h be the height of the CoG from the base, $d_3$ is the vertical position of the CoG from the MWL, and $\theta_5$ is the pitch angle. The submerged volume is:

$$V = \pi R^2 \left( h + \frac{d_3}{\cos(\theta_5)} \right) \qquad (2)$$

The coordinates of the CoB are:

$$x_{CB} = \frac{\sin(\theta_5)(R^2\cos(\theta_5)^2 + R^2 + 4h^2\cos(\theta_5)^2 + 8hd_3\cos(\theta_5) + 4d_3^2)}{8\cos(\theta_5)(d_3 + h\cos(\theta_5))} \qquad (3)$$

$$z_{CB} = \frac{(R^2\cos(\theta_5)^2 - R^2 + 4h^2\cos(\theta_5)^2 + 8hd_3\cos(\theta_5) + 4d_3^2)}{8(d_3 + h\cos(\theta_5))} \qquad (4)$$

The resulting pitch restoring moment is:

$$\tau_y = -\pi \rho g R^2 \sin(\theta_5)\left(h + \frac{d_3}{\cos(\theta_5)}\right) \frac{(R^2\cos(\theta_5)^2 + R^2 + 4h^2\cos(\theta_5)^2 + 8hd_3\cos(\theta_5) + 4d_3^2)}{8\cos(\theta_5)(d_3 + h\cos(\theta_5))} \qquad (5)$$

Linearizing Eq. (5) using Taylor expansion to a first order:

$$\tau_y \approx \frac{-\pi \rho g R^2}{4}(R^2 + 2h^2 + 4hd_3 + 2d_3^2)\theta_5 \qquad (6)$$

The heave restoring force is $$F_h = \rho g \pi R^2 \left( \frac{d_3}{\cos(\theta_5)} - d_{30} \right) \quad (7)$$

$$\approx \rho g \pi R^2 \left( d_3 \left( 1 + \frac{\theta_5^2}{2} \right) - d_{30} \right)$$

where $d_{30}$ is the vertical position of the CoG at equilibrium, for $\theta_5=0$.

The system equations of motion are then:

$$(m + m_\infty^{11})\ddot{d}_1 + m_\infty^{15}\ddot{\theta}_5 + b_1\dot{d}_1 + k_{moor}d_1 = F_e^1 + F_{rad}^1 + u_1 \quad (8)$$

$$(m + m_\infty^{33})\ddot{d}_3 + b_3\dot{d}_3 + \rho g \pi R^2 \left( d_3 \left( 1 + \frac{\theta_5^2}{2} \right) - d_{30} \right) = F_e^3 + F_{rad}^3 + u_3 \quad (9)$$

$$(I_5 + I_\infty^{55})\ddot{\theta}_5 + I_\infty^{51}\ddot{d}_1 + b_5\dot{\theta}_5 + \frac{\pi \rho g R^2}{4}(R^2 + 2h^2 + 4hd_3 + 2d_3^2)\theta_5 = \quad (10)$$

$$F_e^5 + F_{rad}^5 + u_5$$

where $d_1$ is the surge displacement, $d_3$ is the heave displacement, and $\theta_5$ is the pitch angular displacement. The radiation forces can be expressed as:

$$F_{rad}^1 = h_{11}*\dot{d}_1 + h_{15}*\dot{\theta}_5$$

$$F_{rad}^3 = h_{33}*\dot{d}_3$$

$$F_{rad}^5 = h_{51}*\dot{d}_1 + h_{55}*\dot{\theta}_5$$

where * denotes the convolution operator, and $h_{ij}$ are the radiation impulses.

Eqs. (8)-(10) are coupled and nonlinear. If Eq. (9) is linearized, the heave equation becomes linear and decoupled from the surge-pitch equations. If the surge-pitch equations are linearized assuming the higher order terms $d_3 \times \theta_5$ and $d_3^2 \times \theta_5$ are small, a coupled system of equations is obtained of the form:

$$[M]\ddot{\vec{x}} + [C]\dot{\vec{x}} + [K]\vec{x} = \vec{F}_e + \vec{u} \quad (11)$$

where the excitation force vector is $\vec{F}_e = [F_e^1, F_e^3, F_e^5]^T$, the control force vector is $\vec{u} = [u_1, u_3, u_5]^T$, the matrix $[M]$ is:

$$M = \begin{bmatrix} m + m_\infty^{11} & m_\infty^{15} \\ I_\infty^{51} & I_5 + I_\infty^{55} \end{bmatrix}$$

the matrix $[C]$ is:

$$C = \begin{bmatrix} b_1 - h_{11} & -h_{15} \\ -h_{51} & b_5 - h_{55} \end{bmatrix},$$

and the matrix $[K]$ is:

$$K = \begin{bmatrix} k_{moor} & 0 \\ 0 & k_{22} \end{bmatrix} \quad (12)$$

where $$k_{22} = \frac{\pi \rho g R^2}{4}(R^2 + 2h^2)$$

Thus, the pitch-surge system of equations is coupled linear time invariant, and the heave model is an uncoupled linear time invariant equation. This is the dynamic model of a cylindrical WEC. In a similar way, the mathematical model of a spherical buoy can be derived; it is straightforward to show that for a spherical buoy the pitch stiffness and damping are negligible. The heave motion is also decoupled from pitch and surge motions. Results for both cylindrical and spherical buoys are described below.

The 3-DOF WEC Control Problem

As described above, the heave motion is usually decoupled from the pitch-surge motions, and hence the control problem for the heave mode can be solved independently from the pitch and surge modes. The heave control problem is addressed in several references and there are several numerical methods that can be implemented to control the heave motion in an optimal sense in terms of heave energy absorption. The simulation results described below show energy absorption in the heave mode for the purpose of comparison with the energy absorption in the pitch and surge modes. In computing the heave control, a multi-resonant control approach can be implemented, as described in the related U.S. application Ser. No. 15/830, 752. It is a time domain implementation for the complex conjugate control. See J. Falnes, Marine Structures 20(4), 185 (2007). Note that for optimal heave energy absorption, the buoy heave motion should be in resonance with the excitation force (i.e., the excitation force is in phase with the buoy vertical velocity).

The pitch-surge control problem is a Multi-Input Multi-Output (MIMO) system control where the two inputs are the control force along the surge direction, $u_3$, and the control moment along the pitch direction, $u_5$. Both controls are organized in the vector $\vec{u}$ which, hereinafter, will refer to these two controls only; the heave control is $u_1$ and is not included in $\vec{u}$. The outputs of this system $\vec{\eta}$ are the surge position and the pitch angular positions.

Consider the matrix form of the equations of motion, Eq. (11). Evaluating the radiation impulse terms results in radiation damping and added masses that are frequency dependent. The analysis starts with the simple case of a regular wave of frequency $\omega_i$; in this case the matrices $[M]$ and $[C]$ become constant matrices. Then the equation of motion can be written as:

$$\ddot{\vec{x}}_i = -[M_i]^{-1}[K]\vec{x}_i - [M_i]^{-1}[C_i]\dot{\vec{x}}_i + [M_i]^{-1}(\vec{F}_{ei} - \vec{u}) \quad (13)$$

where the subscript i is added to indicate that this equation is valid for a wave frequency $\omega_i$. If the WEC problem is further considered without the damping and without the external forces terms, the following is obtained:

$$\ddot{\vec{x}}_i = -[M_i]^{-1}[K]\vec{x}_i \quad (14)$$

which is an eigenvalue problem. The eigenvalues of the WEC system are determined by the matrix $[M_i]^{-1}[K]$. See G. Tak'acs and B. Rohal'-Ilkiv, *Basics of Vibration Dynamics*, London: Springer London, 2012, pp. 25-64. These eigenvalues have a very well-defined physical meaning: they contain the square of the angular natural frequencies of the system. For this WEC system there are two eigenvalues.

To harvest the maximum energy from the incoming wave a buoy motion should resonate with the incoming wave; i.e. the natural frequencies need to match that of the incoming wave excitation force. To achieve this, the control should change the eigenvalues of the system. Consider a control of the form:

$$\vec{u}_i = -[K_{pi}]\vec{x}_i - [K_{di}]\dot{\vec{x}}_i \quad (15)$$

where each of the $[K_{pi}]$ and the $[K_{di}]$ is a 2×2 matrix. Substituting this control into Eq. (13), the following is obtained:

$$\ddot{\vec{x}}_i = -[M_i]^{-1}([K]+[K_{pi}])\vec{x}_i - [M_i]^{-1}([C_i]-[K_{di}])$$
$$\dot{\vec{x}}_i + [M_i]^{-1}\vec{F}_{ei} \quad (16)$$

For this closed loop system, the eigenvalues are computed for the matrix $[M_i]^{-1}([K]+[K_{pi}])$; the matrix $[K_{pi}]$ can be designed so that each of the natural frequencies of the closed loop system, $\omega_{n1}$ and $\omega_{n2}$, matches the frequency $\omega_i$ of the wave excitation force $\vec{F}_{ei}$. That is:

$$\omega_{n1} = \omega_{n2} \times \omega_i \quad (17)$$

The natural frequencies for the closed loop system are defined as:

$$\begin{bmatrix} w_{n1}^2 & 0 \\ 0 & w_{n2}^2 \end{bmatrix} = [M_i]^{-1}([K]+[K_{pi}]) \quad (18)$$

See W. Palm, *Mechanical Vibration*, John Wiley, 2007. Using Eq. (17), Eq. (18) can then be used to solve 4 equations in 4 unknowns, the elements of the $[K_{pi}]$ matrix. This completes the design of the proportional part of the controller.

The derivative part of the controller is designed so as to double the damping of the system. Hence, $[K_{di}]=[C_i]$. Substituting into Eq. (11), the following is obtained:

$$\ddot{\vec{x}}_i = -[M_i]^{-1}([K]-[K_{pi}])\vec{x}_i - 2[M_i]^{-1}[C_i]\dot{\vec{x}}_i + [M_i]^{-1}\vec{F}_{ei} \quad (19)$$

The proportional part of the control is designed so as to resonate the system with the excitation force at that frequency, and the derivative part is set to equal the damping in the system. These criteria are the same as the Complex Conjugate Control (C3) criteria; the difference between this control strategy and the C3 is that this control is a time domain implementation. Hence the control of the present invention is referred to as Proportional-Derivative Complex Conjugate Control (PDC3). The PDC3 was detailed above for a regular wave. For an irregular wave, the concept of the PDC3 is described below. Finally, note that this WEC dynamic system (described by Eq. (13)) can be represented by a transfer function, $G_i(s)$, in the Laplace domain. For this WEC system, a state vector $\vec{\xi}$ is defined as:

$$\vec{\xi} = [d_1, \theta_s, \dot{d}_1, \dot{\theta}_s]^T \quad (20)$$

Hence, using Eq. (13) the state space model can be written as:

$$\dot{\vec{\xi}} = [A_i]\vec{\xi} + [B_i](\vec{F}_{ei}+\vec{u}_i) \quad (21)$$

$$\vec{\eta} = [E_i]\vec{\xi} + [D_i](\vec{F}_{ei}+\vec{u}_i) \quad (22)$$

where, $$[A_i] = \begin{bmatrix} [I] & [0] \\ -[M_i]^{-1}[K_i] & -[M_i]^{-1}[C_i] \end{bmatrix},$$

The $[I]$ is a 2×2 identity matrix, and the $[0]$ is a 2×2 zeros matrix.

$$[B_i] = \begin{bmatrix} [0] \\ [M_i]^{-1} \end{bmatrix},$$

$$[E_i] = \begin{bmatrix} 0, 0, 1, 0 \\ 0, 0, 0, 1 \end{bmatrix},$$

$$[D_i] = [0],$$

It becomes straightforward to compute the transfer functions matrix the Laplace transform for Eqs. (21) and (22) are taken:

$$s\vec{\chi}(s) = [A_i]\vec{\chi}(s) + [B_i](\vec{F}_{ei}(s)+\vec{U}_i(s)) \quad (23)$$

$$\vec{Y}_i(s) = [E_i]\vec{\chi}(s) + [D_i](\vec{F}_{ei}(s)+\vec{U}_i(s)) \quad (24)$$

where $\vec{\chi}(s)$, $\vec{Y}_i(s)$, $\vec{F}_{ei}(s)$, $\vec{U}_i(s)$ are the Laplace transforms of $\vec{\xi}(t)$, $\vec{\eta}(t)$, $\vec{F}_{ei}(t)$, $\vec{u}_i(t)$, respectively. Solving Eq. (23) for $\vec{\chi}(s)$ and substituting into Eq. (24) the following is obtained:

$$\vec{Y}_i(s) = ([E_i](s[I]-[A_i])^{-1}[B_i]+[D_i])(\vec{F}_{ei}(s)+\vec{U}_i(s)) \quad (25)$$

Figure 3:
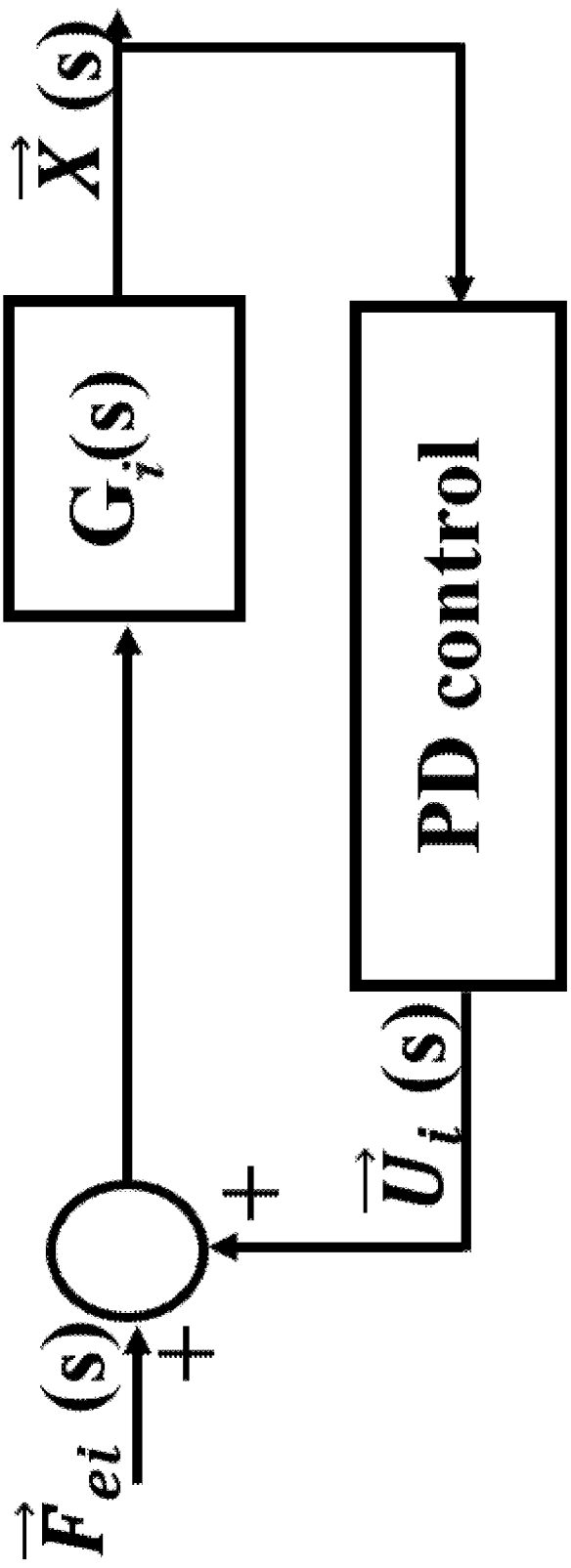
FIG. 3 is a block diagram of the WEC control system in a regular wave.

The transfer function matrix of this WEC system in a regular wave of frequency $\omega_i$ is then:

$$G_i(s) = [E_i](s[I]-[A_i])^{-1}[B_i]-[D_i] \quad (26)$$

which, in this case, is a 2×2 matrix that has 4 transfer functions. FIG. 3 shows a block diagram for this WEC control system. This block diagram is a building block in the multi-resonant control described below for irregular waves.

Multi-Resonant Control for 3-DOF WECs

Figure 4:
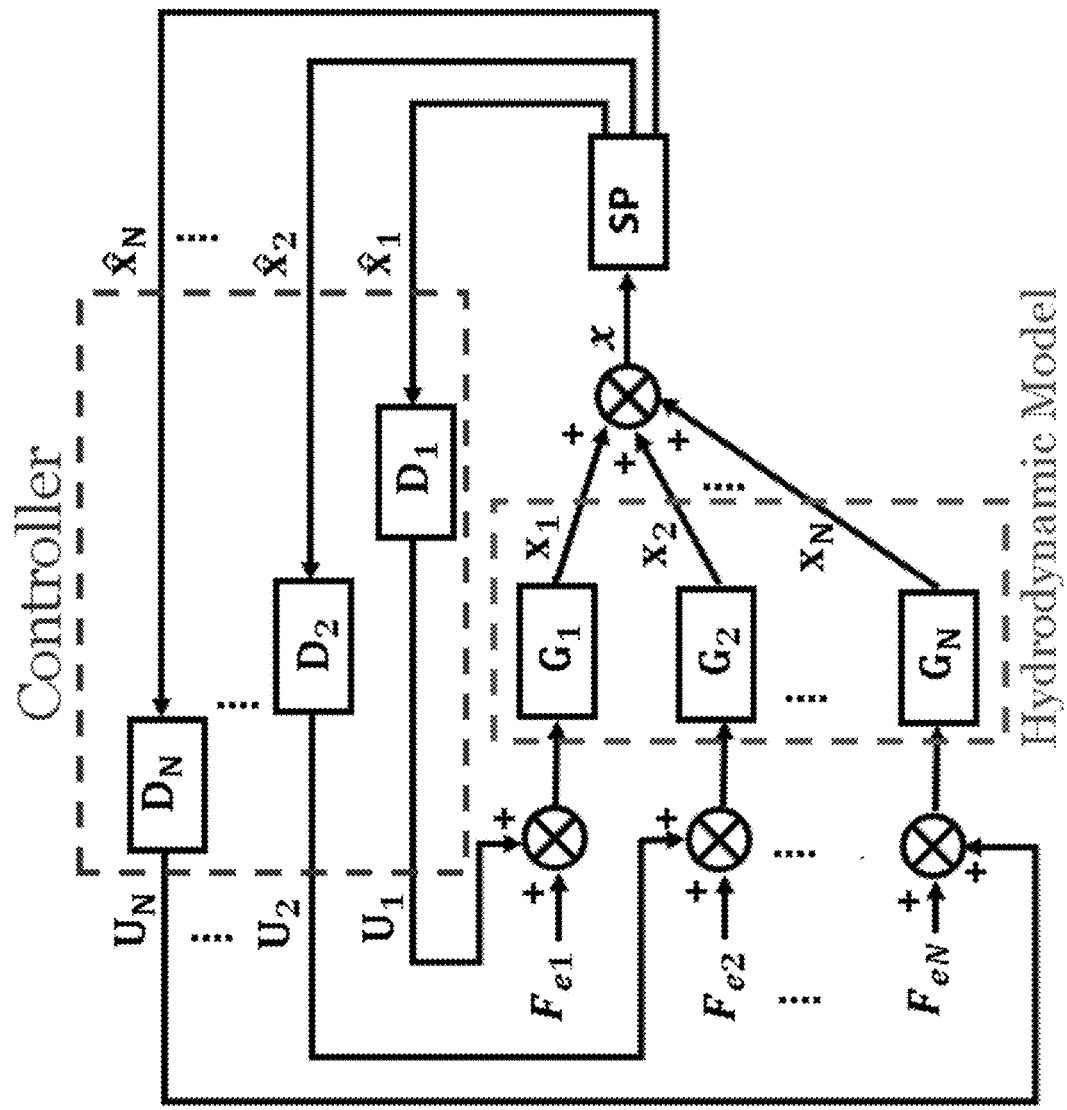
FIG. 4 is a block diagram of the WEC multi-resonant control system.

The concept of the multi-resonant control for a 1-DOF linear heave motion is described in the related U.S. application Ser. No. 15/830,752. It is here extended to the 2-DOF coupled pitch-surge motion. The strategy of the multi-resonant feedback control is to measure the system motion and use these measurements in a feedback control to tune the system's natural frequencies so as to resonate them with the motion frequencies. The excitation force in an irregular wave, however, has many frequencies. As shown in FIG. 4, the measured signals in the vector $\vec{x}$ (in this 2-DOF problem, the pitch angular position and surge position are measured) go through a signal processing step (SP block) in which the frequencies, amplitudes, and phases of each of the pitch and surge motions are extracted. The main purpose of the multi-resonant feedback control is to design a controller for each of these frequencies such that a PDC3 is achieved for that frequency, as described below.

The WEC system reacts differently to each exciting frequency (that is radiation damping and added mass depend on the frequency); hence the system dynamics is presented as a series of transfer functions $G_i$, as shown in FIG. 4. Each $G_i$ represents the dynamics of the WEC in the presence of excitation force $F_{ei}$ of a regular wave with frequency $\omega_i$. Thanks to the linear wave theory, the WEC response to an irregular wave is the collective responses of all the $G_i$ systems, each at its frequency. Note that each $G_i$ is a transfer function matrix that represents a MIMO system identical to the system described above in the section titled The 3-DOF WEC Control Problem. Hence, a PD control $\vec{u}_i$ can be designed for each $G_i$ (i.e. for each frequency component of $\vec{x}$) in an optimal sense in a similar way to that described above. The computed controls are then summed to obtain the control $\vec{u}$. Hence, there are N PD controls to be designed for N frequencies in the feedback signal. Note that in order to design each of the N PD controls, the amplitudes and phases of pitch and surge motions, in each individual frequency, are needed to compute the feedback control (see Eq. (15)). That is why the SP block extracts these amplitudes and phases for all N frequencies. The feedback control is computed as follows:

$$\vec{u} = \sum_{i=1}^{N} \vec{u}_i = \sum_{i=1}^{N} -[K_{pi}]\vec{x}_i - [K_{di}]\hat{\vec{x}}_i \quad (27)$$

Let the output of the system $\vec{Y}$ be the vector $\vec{x}$ that includes the pitch angular position and the surge position, then the output can be computed in the Laplace domain as follows:

$$\vec{Y}(s) = \sum_{i=1}^{N} \vec{Y}_i(s) = \sum_{i=1}^{N} G_i(s)(\vec{F}_{ei}(s) + \vec{U}_i(s)) \quad (28)$$

Finally, it is worth noting that in implementing this PDC3 control, it is not needed to decompose the excitation force $\vec{F}_e$ into its components $\vec{F}_{ei}$. It is decomposed in FIG. 4 only for illustration; in reality the system dynamics takes care of that since each $G_i$ reacts only to the $\vec{F}_{ei}$ component of $\vec{F}_e$.

This implementation of the PD control is different from previous implementations such as the PD control implementation in Yavuz in which only one PD control is designed to control the system, and a tuning step for the gains is conducted to improve the extracted energy. See H. Yavuz, *Int. J. Green Energy* 8(5), 555 (2011). Hence the PD control in Yavuz is not optimal since it is only one control for all frequencies. On the other hand, in the multi-resonant PD control implementation of the present invention, there are N PD controllers, each of the PD controller gains are the optimal gains for their corresponding frequency. Hence, the present invention targets optimal energy harvesting, depending on the accuracy of the signal processing unit. In order to extract the frequencies, amplitudes, and phases of the measured signals, a signal processing step is conducted which is described below.

Signal Processing

There are several methods that can be used to extract the frequencies, amplitudes, and phases of a dynamic signal. The details of using a Fast Fourier Transform for that purpose are described in the related U.S. application Ser. No. 15/830,752. Other frequency extraction techniques, such as Kalman filters or least-squares estimators, can also be used. As an example of the invention, a simple least squares error minimization approach is described below. The estimate of the measured signal (e.g. estimate of surge motion) is represented as a series expansion as follows:

$$\hat{x}(t) = \sum_i A_i \cos(\omega_i t) + B_i \sin(\omega_i t) \quad (29)$$

where the coefficients $A_i$ and $B_i$ are unknown parameters. The $A_i$ and $B_i$ coefficients are computed so as to minimize the summation of the error squares, computed over a period of time (time window). The window size in seconds is fixed and is moving as new estimates are computed. The frequencies $\omega_i$ are known since the signal is assumed to have all frequencies listed in a selected vector of discrete frequencies. This optimization problem is relatively simple since the error is a linear function of the coefficients $A_i$ and $B_i$, these coefficients are then used to compute the magnitude and phase at each frequency in the selected frequency vector. The accuracy of the estimation depends on the accuracy of the selected frequencies in the frequency vector and on the window size. The higher the number of the frequencies in the selected frequency vector, the more accurate is the estimate and the higher is the computational cost. This trade off can be solved via various simulations. The optimal window size can also be obtained via numerical simulations as described below in the Discussion section.

Numerical Tests

The numerical tests described in this section include cases for a spherical buoy and for a cylindrical buoy. The cylindrical buoy has a radius of 0.8604 m, and a height of 0.7294 m. The mass of the cylindrical buoy is 858.3987 kg. The spherical buoy has a radius of 0.736 m and a mass of 858 kg. Tests include a regular wave, a Bretschneider wave, and an Ochi-Hubble wave.

Cylindrical Buoy in Regular Wave

Figure 5:
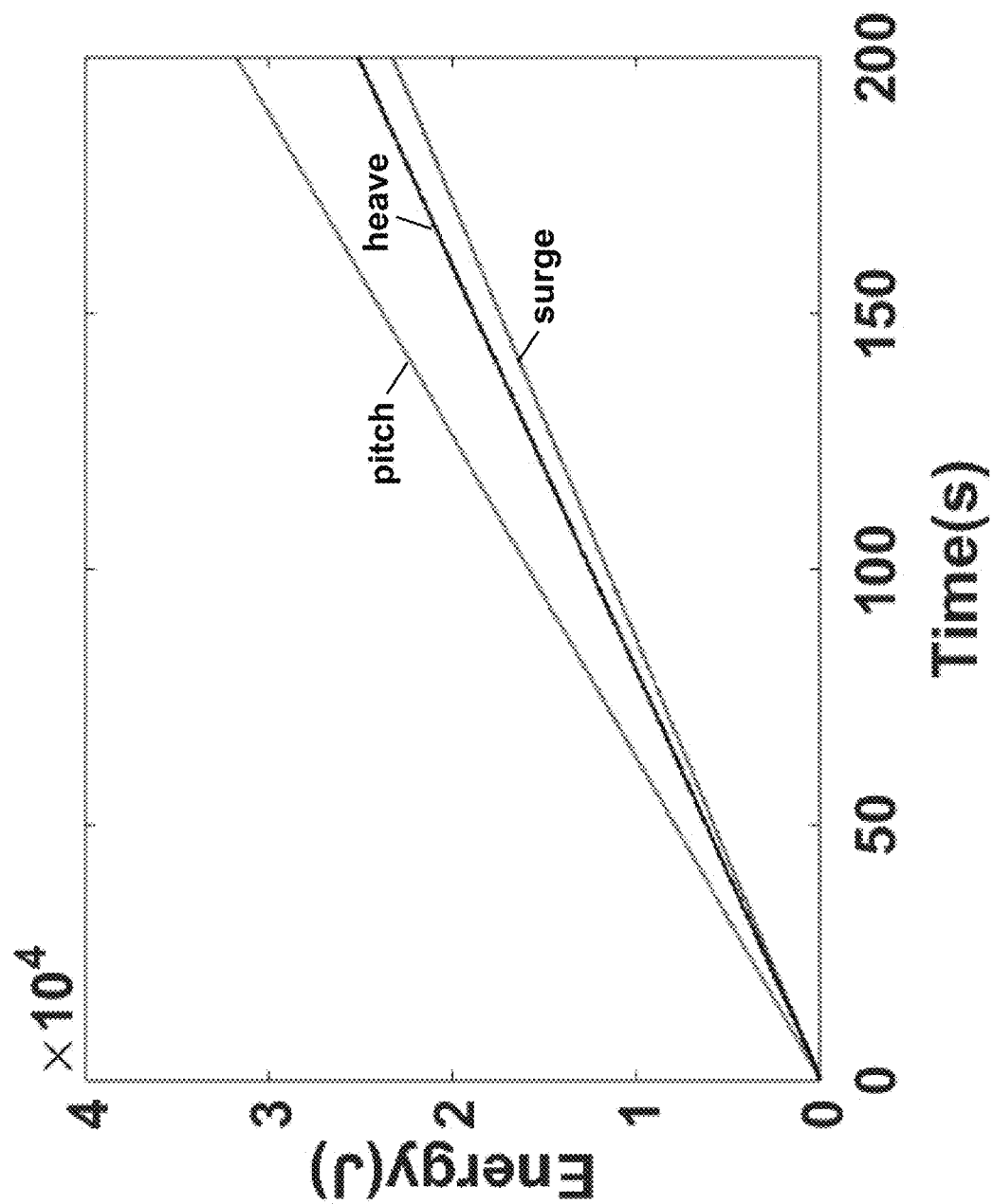
FIG. 5 is a graph of the harvested energy in heave, pitch and surge modes for a cylindrical buoy in a regular wave.

The cylindrical buoy is tested in a regular wave of amplitude 0.2 m. FIG. 5 shows the extracted energy in all the three modes. The energy harvested from the 3-DOF system is slightly higher than three times the energy harvested from only the heave mode.

Bretschneider Wave

Cylindrical Buoy: Consider a wave with Bretschneider spectrum and a significant wave period of 1.5708 seconds, and a significant wave height of 1.2 m. The Bretschneider spectrum is simulated using 1200 frequencies. The signal processing extracts the most dominant 126 frequencies in the motion and the PDC3 control uses N=126 individual PD controls.

Figure 6:
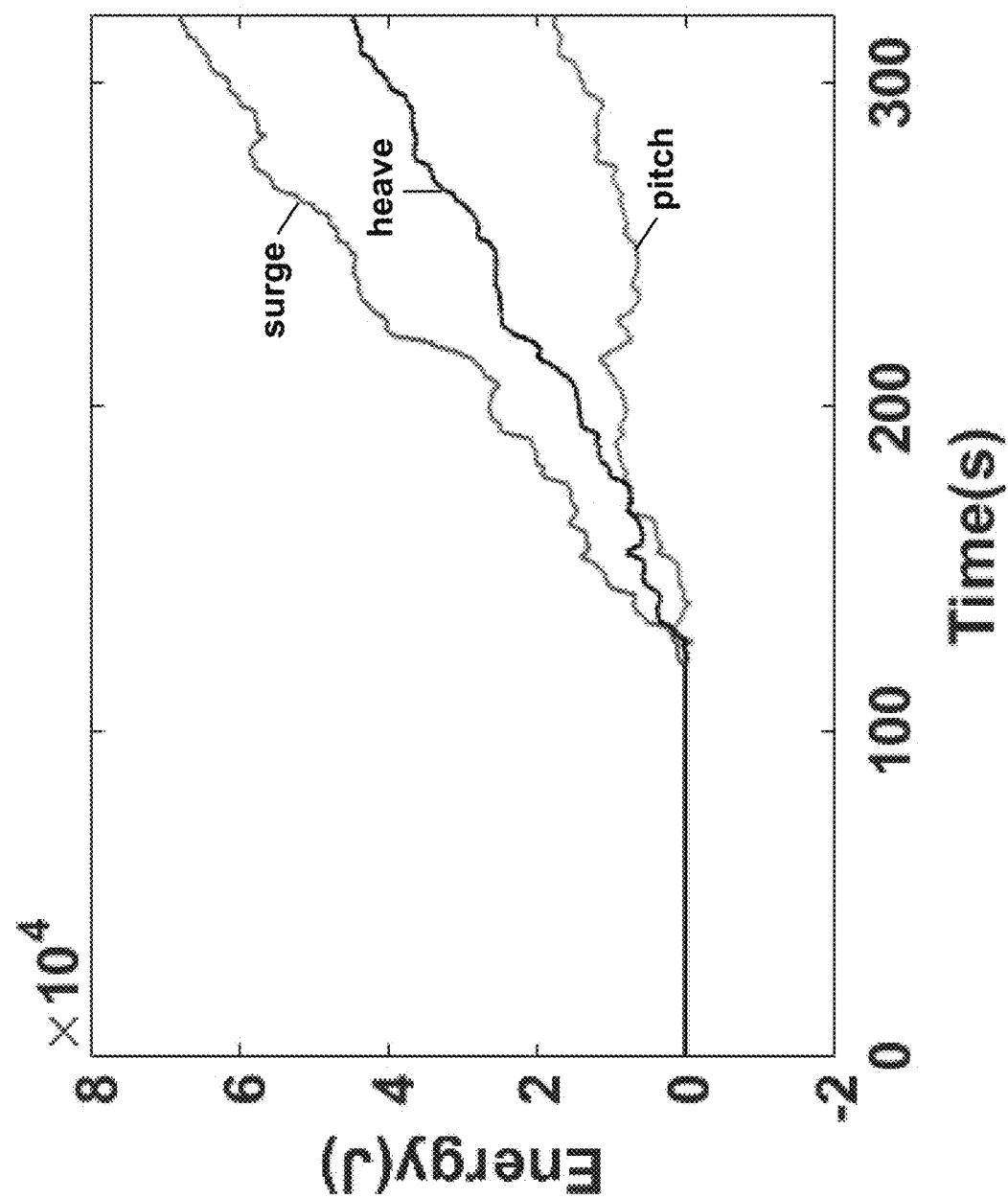
FIG. 6 is a graph of the harvested energy in heave, pitch and surge modes for a cylindrical buoy. The total energy harvested in the 3-DOF is about 3 times the energy harvested in the heave mode alone.
Figure 7:
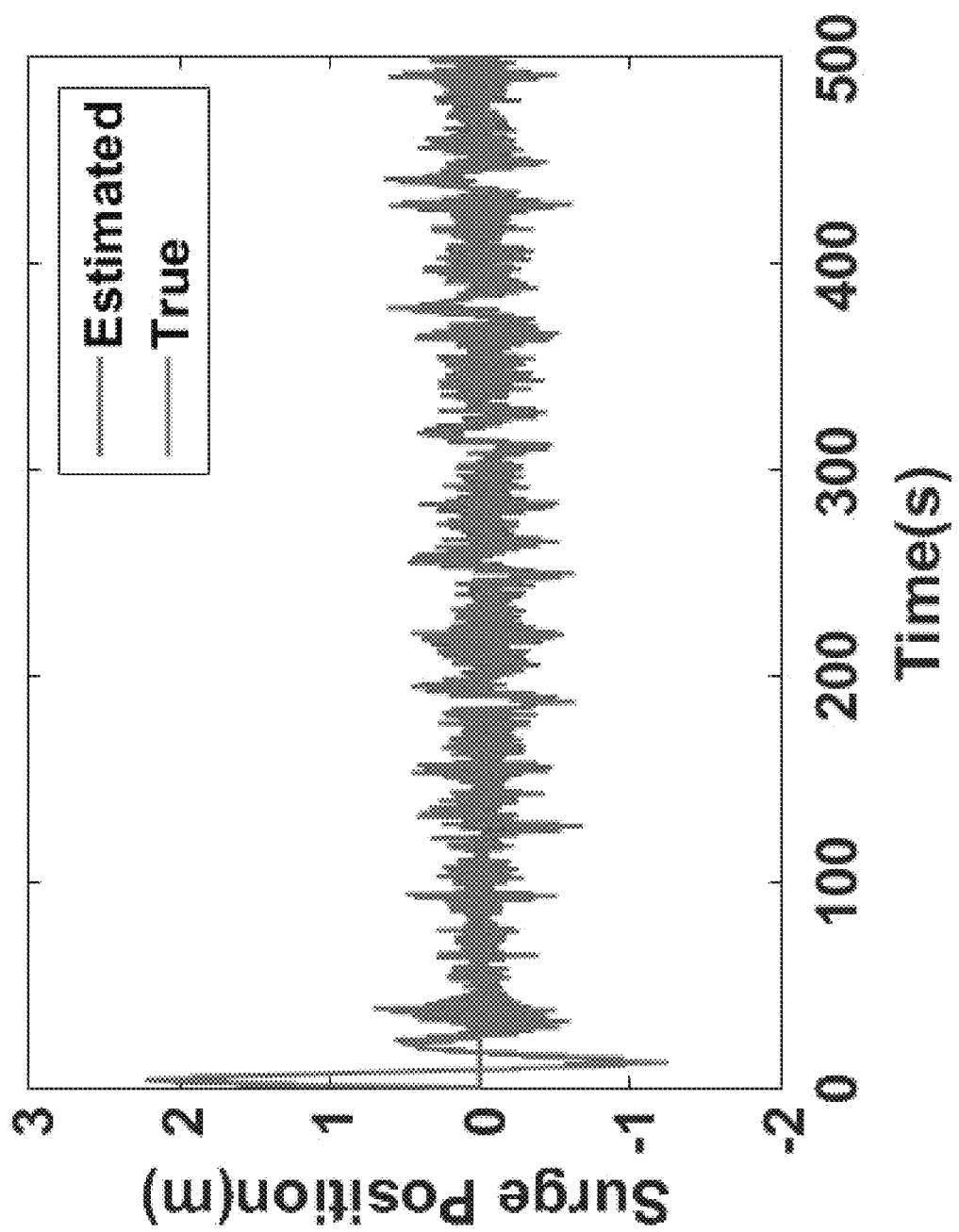
FIG. 7 is a graph of the surge motion for the cylindrical buoy in a Bretschneider wave.
Figure 8:
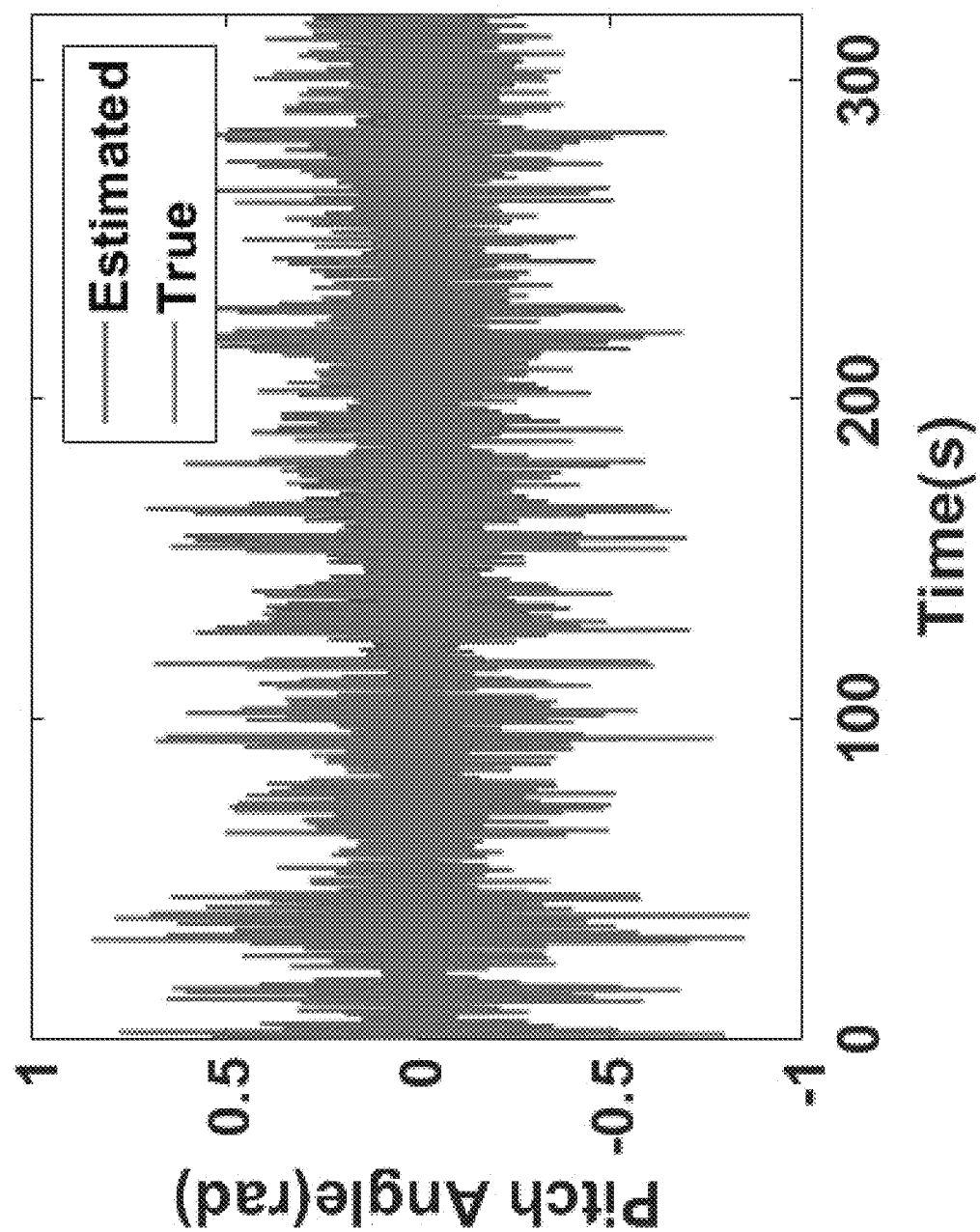
FIG. 8 is a graph of the pitch motion for the cylindrical buoy in a Bretschneider wave.
Figure 9:
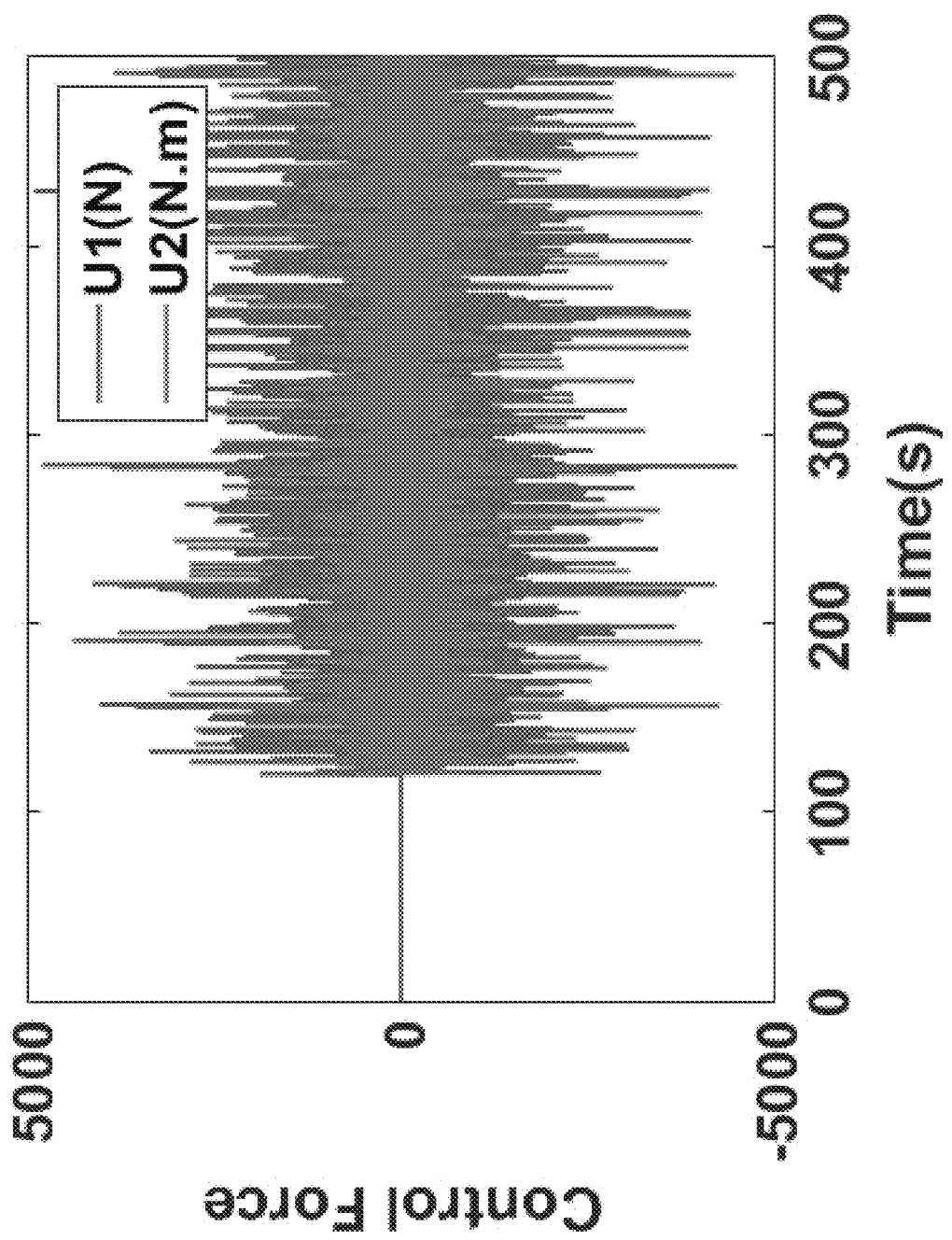
FIG. 9 is a graph of the control in both the pitch and surge modes.

Using the PDC3 control, the energy harvested in heave, surge, and pitch modes is shown in FIG. 6. The total energy harvested from both pitch and surge motions is $8.545 \times 10^4$ Joules, and the energy harvested in the heave mode is $4.4802 \times 10^4$ Joules. This means that this 3-DOF buoy harvests about 3 times the energy harvested from the heave mode alone. The parametric excitation is due to the heave motion which, in this test, has an amplitude of 0.3 m most of the time and it reaches to 0.5 m at some times. The surge motion amplitude is about 0.25 m as shown in FIG. 7, which shows both the estimated and real (true) surge motions. FIG. 8 shows the estimated and real (true) pitch motions. FIG. 9 shows the control force/torque in both the surge and pitch modes.

Figure 10:
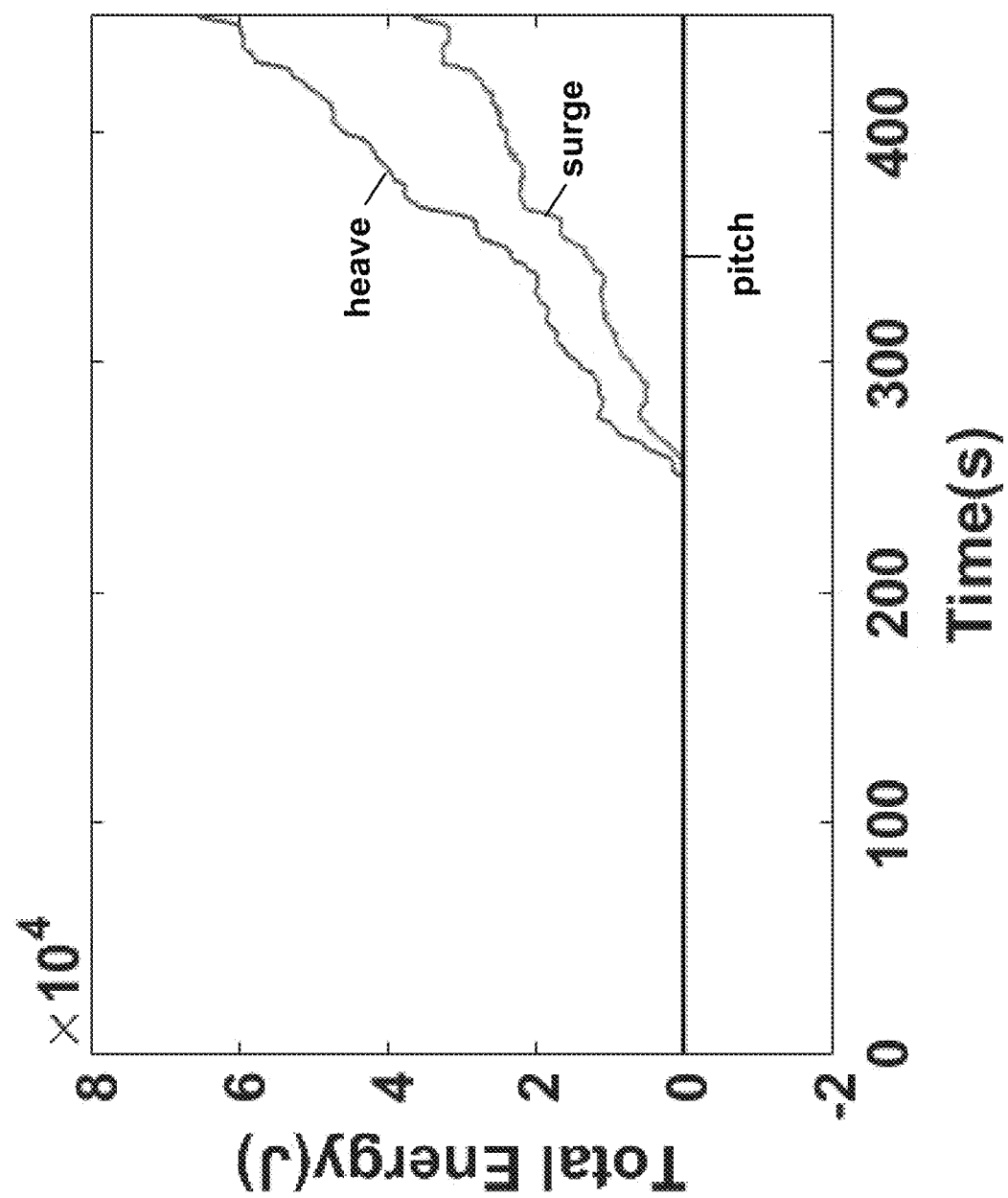
FIG. 10 is a graph of the harvested energy in heave, pitch and surge modes for a spherical buoy.

Spherical Buoy: A Bretschneider spectrum is used also with a significant wave period of 1.5708 seconds, and significant wave height of 1.2 m. The bretschneider spectrum is simulated using 1200 frequencies. The signal processing extracts the most dominant 126 frequencies in the motion and the PDC3 control uses N=126 individual PD controls. Using the PDC3 control, the energy harvested in heave, surge, and pitch modes is shown in FIG. 10. As expected, there is no energy harvested in the pitch direction since for the spherical buoy the pitch damping is almost zero. The energy harvested in the surge mode is about 60% of that harvested in the heave mode.

Cylindrical Buoy in Ochi-Hubble Wave

Figure 11:
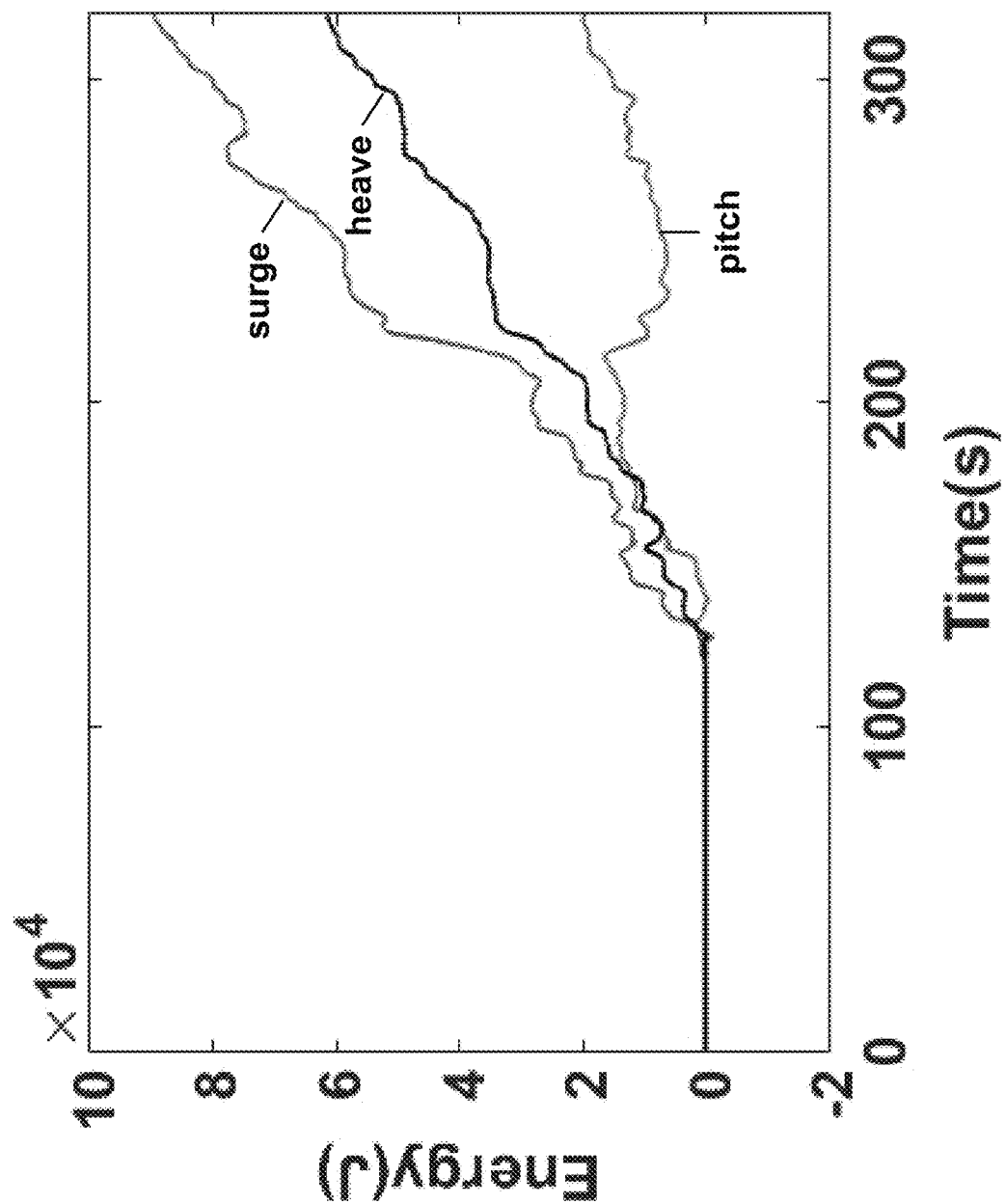
FIG. 11 is a graph of the harvested energy in heave, pitch and surge modes for a cylindrical buoy in Ochi-Hubble wave.
Figure 12:
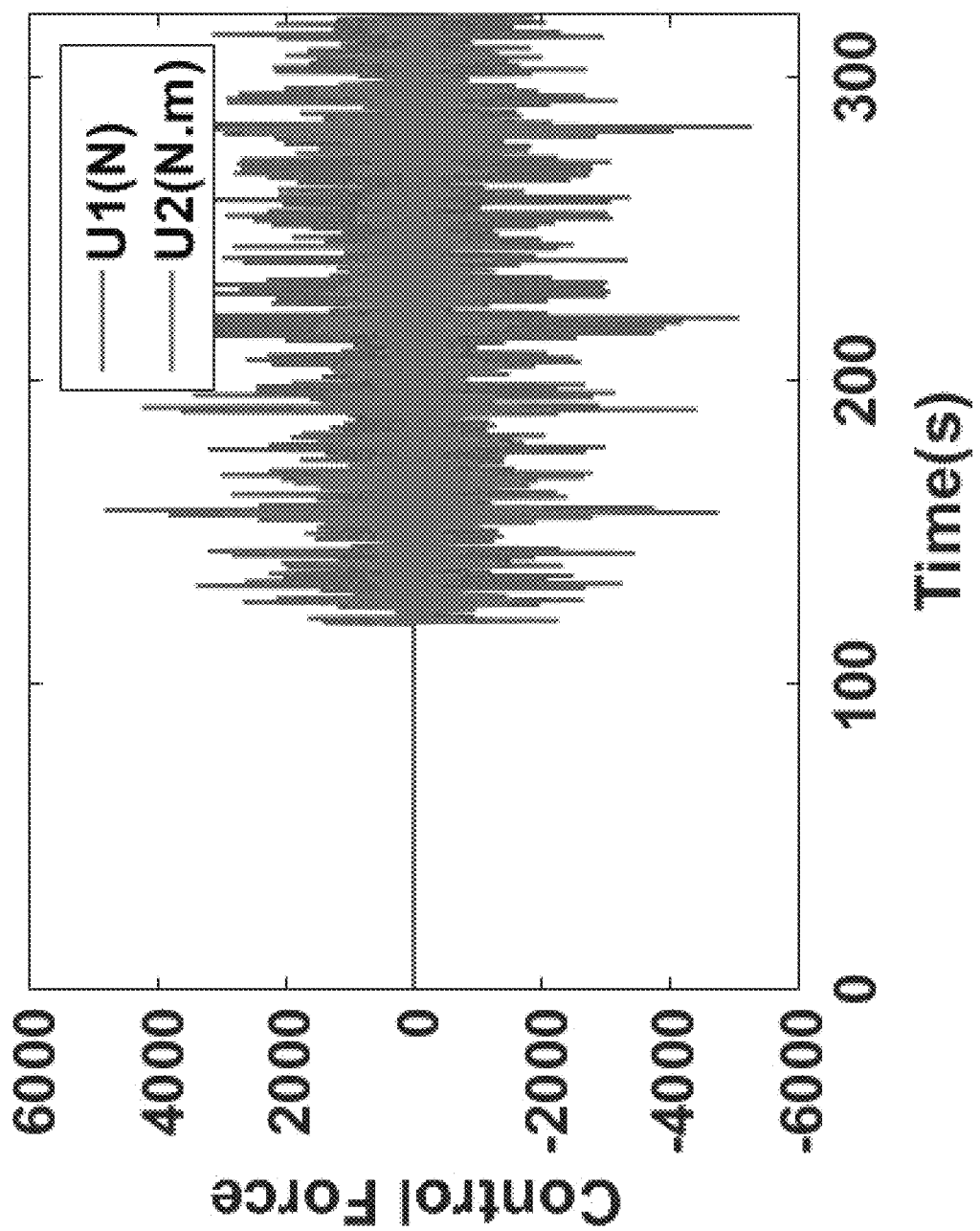
FIG. 12 is a graph of the harvested energy in heave, pitch and surge modes for a cylindrical buoy in Ochi-Hubble wave.

The cylindrical buoy is tested in an Ochi-Hubble wave of significant wave height of 1.2 m. FIG. 11 shows the extracted energy in all the three modes. The heave motion amplitude in this case is within 0.3 m amplitude most of the time; at times it can go up to 0.5 m. FIG. 12 shows the applied control in both pitch and surge mode.

DISCUSSION

Figure 13:
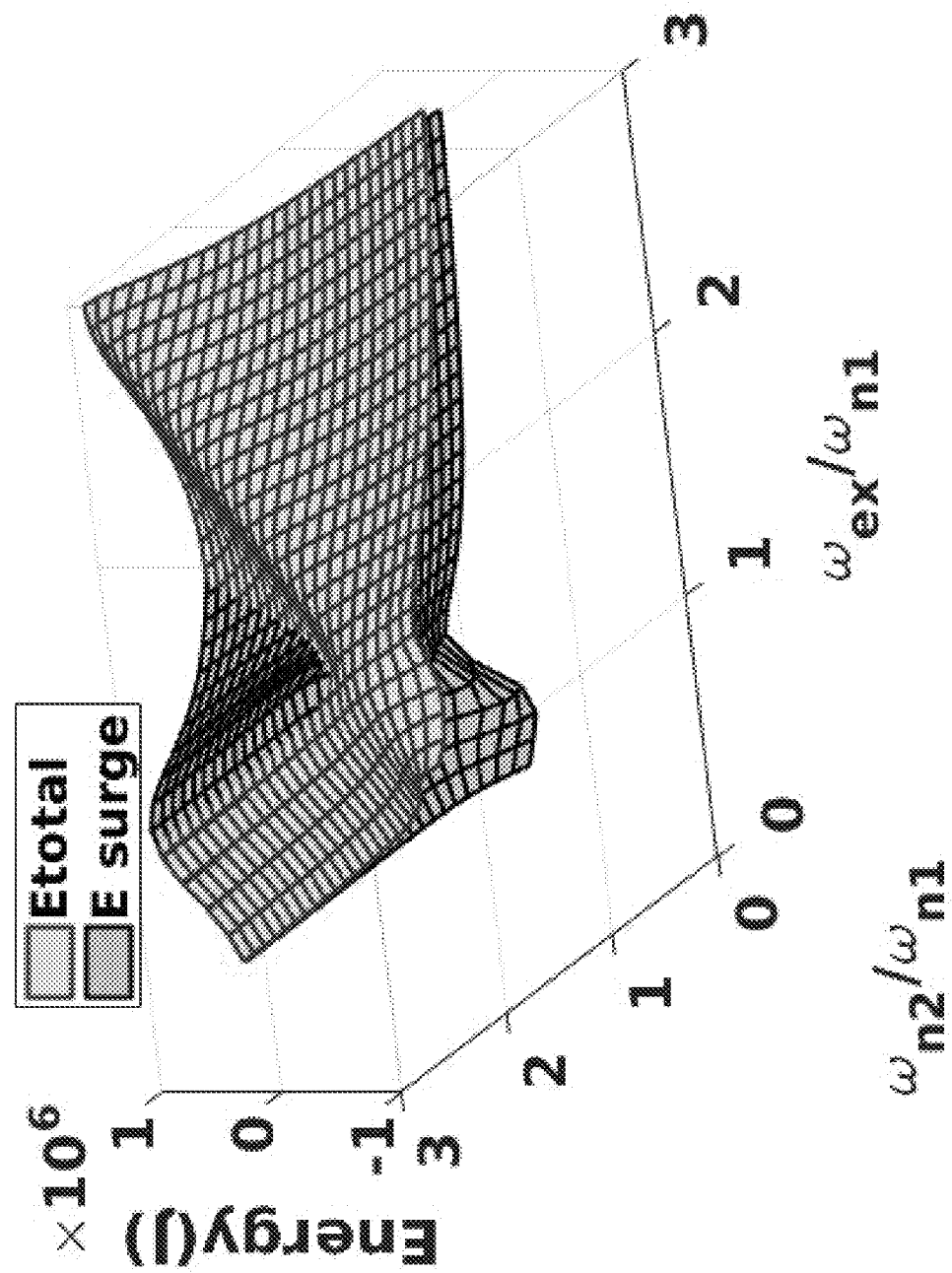
FIG. 13 is a graph of the total harvested energy (in both pitch and surge) and the harvested energy in surge only for a cylindrical buoy at various design points of the system natural frequencies.

The PDC3 of the present invention targets maximizing the harvested energy assuming the feasibility of harvesting power in both surge and pitch modes. Harvesting power in both modes requires having actuators in each one of them. The PDC3 can shift the energy harvesting from one mode to another, thereby eliminating the need for two actuators. Using only one actuator, while maintaining about the same order of magnitude energy harvesting, has a significant impact in terms of reducing the complexity and cost of the WEC device. To do that, the natural frequencies of the pitch and surge modes can be selected differently from the previous choice presented in Eq. (17). Specifically, in Eq. (17) the natural frequencies of the pitch and surge modes are selected to resonate with the motion frequency; that selection enables maximum energy harvesting in each of the pitch and surge modes. If the objective is to harvest maximum energy from one mode (e.g. surge) only; then it is better to choose the natural frequencies of the two modes such that most of the energy harvesting is shifted from the pitch to the surge. To find the best selection for the natural frequencies in this case, FIG. 13 is generated which shows how the total harvested energy (from both pitch and surge) varies over a range of selections for the natural frequencies of surge and pitch modes, in a regular wave of height 2.1 m. This figure also shows how the energy harvested in the surge mode only varies over the same range. Note that, in some regions, the surge energy surface is higher than that of the total energy which indicates that the pitch actuator is actually adding power to the water as opposed to absorbing power. FIG. 13 shows clearly the point of maximum total power, that corresponds to Eq. (17), for which the harvested energy comes from both surge and pitch. If having no actuator on the pitch mode is desired, then the energy harvesting in the pitch mode should be zero. This condition is satisfied at the lines of intersection between the two surfaces in FIG. 13. So, a candidate selection for the natural frequencies in this case is to consider only the line of intersection between the two surfaces and pick the point of maximum energy on this line. In FIG. 13, the point that corresponds to $\omega_{ex}/\omega_{n1}=0.9$ and $\omega_{n2}/\omega_{n1}=3$ is close to that condition; the surge harvested energy at this point is $7.505 \times 10^5$ Joules and the total energy (if actuators on both pitch and surge are used) would be $7.61 \times 10^5$ Joules.

Figure 14:
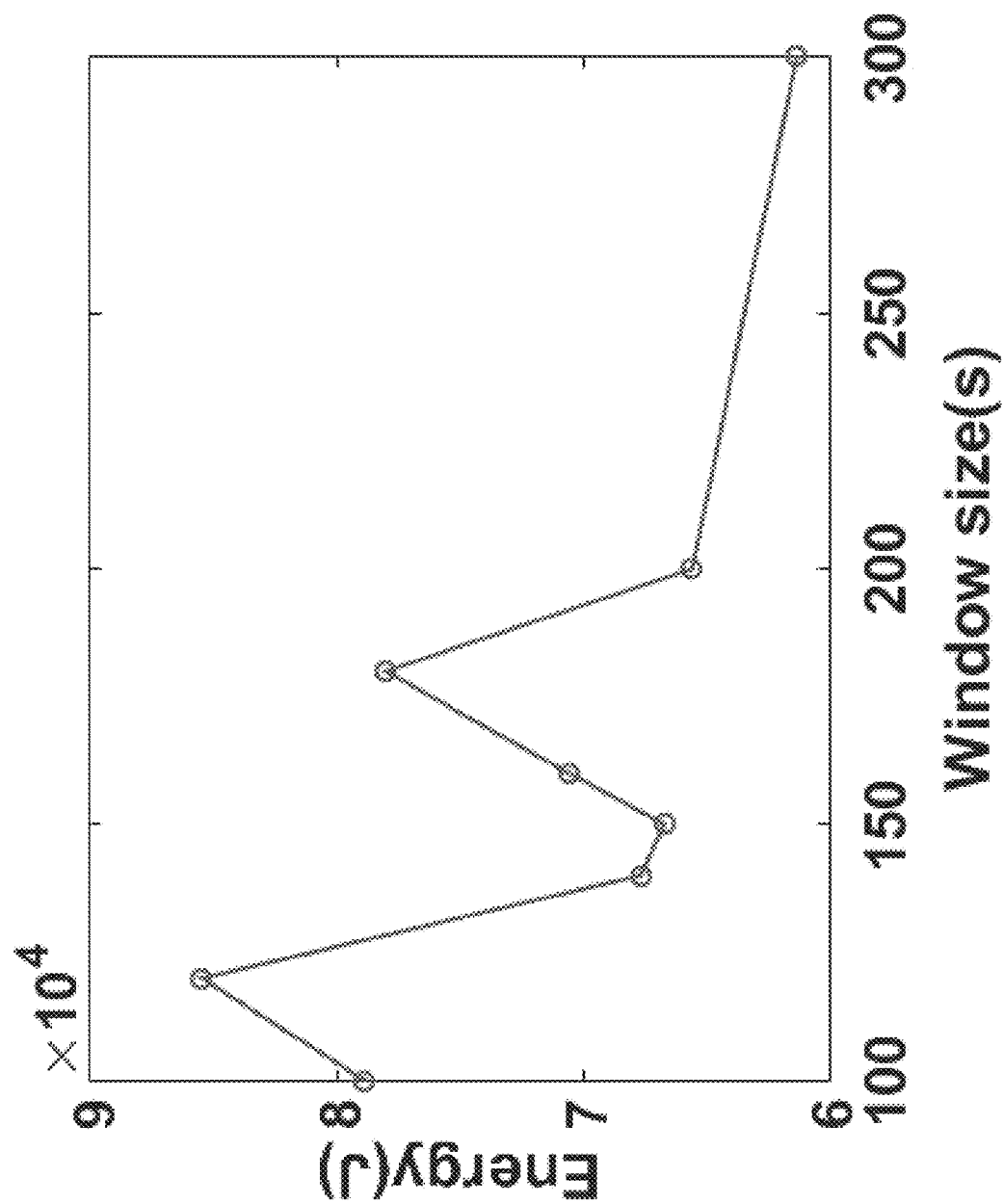
FIG. 14 is a graph of the moving window size affects the accuracy of the obtained estimation. More accurate estimations result in higher energy harvesting.

In the case of a WEC in an irregular wave, there are few parameters that need to be tuned in order to obtain accurate results. One of them is the size of the moving window from which the measurements data are used to extract the frequencies, amplitudes, and phases of the output signals. To tune this parameter, a simulation was conducted on a range of window sizes. The harvested energy, in pitch and surge modes, is plotted versus the window size in FIG. 14 for the cylindrical buoy. The better the estimation of the frequencies, amplitudes and phases the higher the harvested energy since the PDC3 concept is centralized on synchronizing the WEC closed loop system natural frequencies with frequencies of the exciting force. Hence the window size that results in maximum energy harvesting in FIG. 14 is adopted.

The present invention has been described as a method and apparatus for multi-resonant feedback control of multiple degree-of-freedom wave energy converters. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A multi-resonant multiple degree-of-freedom wave energy converter, comprising:
   a buoy in a water environment having a wave motion, wherein the waves impacting the buoy exert an excitation force with a plurality of excitation frequencies that causes a buoy motion in heave, surge, and pitch directions relative to a reference,
   a sensor for measuring the position or velocity of the buoy in the heave direction relative to the reference for a sample period,
   a heave actuator that is configured to apply a control force in the heave direction to the buoy,
   a feedback controller that uses a signal processor to extract a plurality of frequencies, amplitudes, and phases of the measured position or velocity of the buoy in the heave direction, computes a proportional-derivative control for each of the plurality of extracted frequencies, amplitudes, and phases, adds up each of the proportional-derivative controls to provide a computed control force in the heave direction, and causes the heave actuator to apply the computed control force to the buoy to put the buoy heave motion in resonance with the excitation force,
   a surge actuator that is configured to apply a control force in the surge direction of the buoy, wherein the surge and pitch motions have natural frequencies and wherein the force applied in the surge direction and the natural frequencies of the surge and pitch modes are selected to shift energy harvesting from the pitch to the surge mode, and
   a power take-off means configured to convert the mechanical energy of the buoy heave and surge motions to electrical energy.

2. The wave energy converter of claim 1, wherein the signal processor comprises a Fast Fourier Transform, Kalman filter, or least-squares processor.

3. A multi-resonant multiple degree-of-freedom wave energy converter, comprising:
   a buoy in a water environment having a wave motion, wherein the waves impacting the buoy exert an excitation force with a plurality of excitation frequencies that causes a buoy motion in heave, surge, and pitch directions relative to a reference,
   a heave sensor for measuring the position or velocity of the buoy in the heave direction relative to the reference for a sample period,
   a heave actuator that is configured to apply a control force in the heave direction to the buoy,
   a feedback controller that uses a signal processor to extract a plurality of frequencies, amplitudes, and phases of the measured position or velocity of the buoy in the heave direction, computes a proportional-derivative control for each of the plurality of extracted frequencies, amplitudes, and phases, adds up each of the proportional-derivative controls to provide a computed control force in the heave direction, and causes the heave actuator to apply the computed control force to the buoy to put the buoy heave motion in resonance with the excitation force, a pitch actuator that is configured to apply a control torque in the pitch angular direction of the buoy, wherein the pitch and surge motions have natural frequencies and wherein the torque applied in the pitch angular direction and the natural frequencies of the pitch and surge modes are selected to shift energy harvesting from the surge to the pitch mode, and a power take-off means configured to convert the mechanical energy of the buoy heave and pitch motions to electrical energy.

4. The wave energy converter of claim 3, wherein the signal processor comprises a Fast Fourier Transform, Kalman filter, or least-squares processor.

\* \* \* \* \*